United States Patent Office 3,701,788

Patented Oct. 31, 1972

1

3,701,788

4-AZIDOSULFONYLPHTHALIC ANHYDRIDE

Adnan A. R. Sayigh, North Haven, and Henri Ulrich, North Branford, Conn., assignors to The Upjohn Company, Kalamazoo, Mich.

No Drawing. Filed May 10, 1971, Ser. No. 142,021
Int. Cl. C07c *63/14*
U.S. Cl. 260—346.3 1 Claim

ABSTRACT OF THE DISCLOSURE 4-azidosulfonylphthalic anhydride, obtained by reaction of sodium azide with 4-chlorosulfonylphthalic anhydride, is a novel compound useful, for example, in the preparation of radiation-sensitive polymers containing free carboxylic acid groups.

BACKGROUND OF THE INVENTION

(1) Field of the invention

This invention relates to a novel azide and is more particularly concerned with a novel organic sulfonyl azide and with methods for its preparation.

(2) Description of the prior art

While phthalic acid and its anhydride and many derivatives thereof are widely known, the sulfonazido substituted phthalic anhydride is believed to be novel and has proved to have particularly useful properties especially in regard to its use in the conversion of polymers, which contain a hydroxy group in the recurring unit thereof, to radiation-sensitive polymers which can be used, for example, in the production of continuous tone images and in the chemical bonding of dyestuffs to substrates which are normally not receptive to such dyestuffs.

SUMMARY OF THE INVENTION

This invention comprises the compound 4-azidosulfonylphthalic anhydride having the formula:

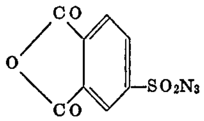

The invention also comprises a process for the preparation of the above compound by reaction of sodium azide with 4-chlorosulfonylphthalic anhydride.

DETAILED DESCRIPTION OF THE INVENTION 4-azidosulfonylphthalic anhydride (I) is a crystalline solid which can be prepared conveniently from 4-sulfophthalic anhydride (II) using the procedure which is illustrated schematically below:

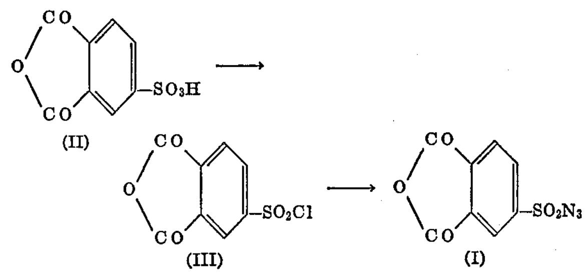

2

4-sulfonylphthalic anhydride (II) is converted to the corresponding sulfonyl chloride by procedures conventional in the art for the conversion of sulfonic acids to the corresponding acid chlorides. Thus, the free sulfonic acid (II) is reacted with phosgene, phosphorus pentachloride, phosphorus trichloride and the like in the presence of an inert solvent such as benzene, toluene, xylene, acetonitrile, ether and the like. Advantageously, the reaction is carried out at elevated temperatures as high as about 100° C. or at reflux temperature of the reaction mixture which ever is lower. The desired sulfonyl halide (III) is isolated from the reaction mixture by conventional procedures, for example, by fractional distillation.

The sulfonyl halide (III) is then reacted with a substantially stoichiometric quantity of sodium azide. The reactants are advantageously brought together slowly, the sodium azide preferably being added to the sulfonyl halide rather than vice versa. The reaction is advantageousyl carried out in the presence of an inert solvent and preferably in the presence of a polar inert solvent such as acetonitrile, N,N-dimethylformamide, N,N-dimethylacetamide, hexamethylphosphoramide and the like. The reaction is exothermic and is controlled, for example, by external cooling, so that the temperature of the reaction mixture does not exceed about 80° C.

The progress of the reaction of the sulfonylchloride (III) with the sodium azide can be followed readily by observation of the rate of deposition of sodium chloride, the by-product of the reaction. When the reaction is adjudged complete, i.e. when no further deposition of sodium chloride is apparent, the reaction mixture is filtered to remove sodium chloride and the 4-azidosulfonylphthalic anhydride (I) is isolated from the filtrate by evaporation of the latter to dryness. The compound (I) so obtained can, if desired, be purified, for example by recrystallization.

The 4-azidosulfonylphthalic anhydride of the invention is useful in a variety of ways; for example, it can be used to prepare radiation-sensitive polymers, since by reaction with a polymer which contains a free hydroxy group in the recurring unit thereof there can be produced a corresponding half ester as is illustrated by the following schematic representation:

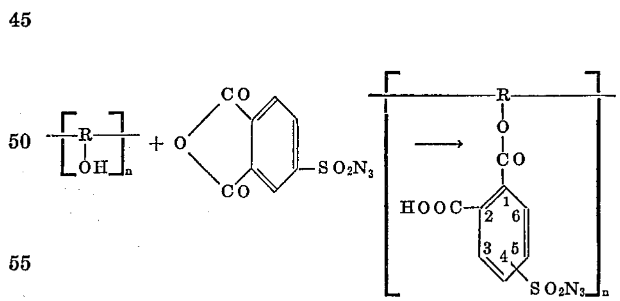

wherein R represents the recurring unit of the hydroxy containing polymer and the —$SO_2N_3$ group in the product is in one of the positions 4 or 5. The above reaction is advantageously carried out in the presence of a tertiary amine such as pyridine or triethylamine. By adjusting the amount of azidosulfonylphthalic anhydride (I) employed, it is possible to convert only one or all of the hydroxy groups in the polymer, or any proportion thereof, to the corresponding half esters.

Examples of hydroxy containing polymers of the above type are polyvinyl alcohols, novolac resins, phenoxy resins and poly(hydroxy dicyclopentadiene)ethers.

The half esters to which the hydroxy containing polymers can be converted as described above contain free carboxylic acid groups which can be converted to salts with salt forming moieties such as alkali metals, alkaline earth metals, ammonia and amines. Most of such salts are water soluble.

The radiation-sensitive polymers obtained in the above manner can be used to bond basic dyestuffs chemically to polymeric and other substrates such as paper, cotton and like cellulosic materials, metal, glass and the like and, in particular aspect of such bonding, can be used in the preparation of continuous tone, non-silver containing images. Thus, the radiation-sensitive polymers can be applied as a film or coating to a part, or the whole, of the surface of the substrate to be treated. The coating is applied advantageously by dissolving the radiation-sensitive polymer in a polar solvent, or, in the case of the carboxylic salts of the radiation-sensitive polymer, by dissolving the latter in water, and applying the resulting solution to the substrate by spraying or spreading thereon.

The coated substrate is then exposed to an appropriate source of radiation, either thermal or actinic, necessary to activate the radiation-sensitive polymer. A variety of sources of thermal and/or actinic radiation can be employed. Such sources include carbon arcs, photographic flood lamps, and tungsten lamps. Preferably, the source of radiation is one which generates ultraviolet light of wavelength within the range of about 250 nm. to about 390 nm.

If desired, the irradiation of the coated substrate can be performed "imagewise"; that is to say, a negative of an image to be produced on the surface of the substrate is interposed between the coated substrate and the source of radiation. The radiation-sensitive polymer in those portions of the coated substrate receiving the radiation is activated and becomes chemically bonded to the surface of the substrate. The chemical bonding of the radiation-sensitive polymer to the substrate is believed to take place by degradation of the sulfonazido group or groups in the recurring unit of said polymer, to yield a nitrene radical which enters into interaction with C—H bonds in the substrate. This suggested reaction mechanism is, however, offered by way of explanation only and is not intended in any way to define or limit the scope of the present invention.

When the coating of the radiation-sensitive polymer has been bonded to the substrate in the above manner, the surface of the substrate, or, in the case of imagewise irradiation, that portion of it bearing the irradiated image, has directly bonded to it a series of free carboxyl groups in the recurring units. The resulting image in the latter case can be developed by removal of the unchanged polymer from the unirradiated areas. This can be accomplished by washing with the same or like solvent employed in making the original coating by treatment with an aqueous solution of an alkali metal hydroxide or ammonium hydroxide, or an amine.

The irradiated, coated substrate, after development of image, if any, is then treated with a basic dyestuff whereby the latter becomes bonded, via the carboxyl groups in the irradiated polymer, to the surface of the substrate. The application of the dyestuff can be accomplished in any conventional manner, as by dipping in a bath of dyestuff, or application of dye by roller, sponge, and the like.

The term "basic dyestuff" is one well recognized in the art as characterizing a particular class of dyestuffs, namely, those which will react with an acid (mineral acid or organic carboxylic acid) to form a corresponding salt.

A comprehensive list of basic dyestuffs and a description of their properties is set forth in Colour Index, second edition, vol. 1, pages 1617–1653, 1956, published jointly by The Society of Dyers and Colourists, Bradford, Yorkshire, England, and The American Association of Textile Chemists and Colorists, Lowell, Mass. Any of the basic dyestuffs set forth in said Colour Index can be employed in the process and compositions of the invention. Generally said basic dyestuffs are employed in the form of aqueous solutions.

Typical of said basic dyestuffs are: crystal violet, methylene blue, malachite green, auramine O, basic fuchsin, Aniline Yellow, Disperse Orange 3, Disperse Black 7, Disperse Red 13, Disperse Red 9, Vat Red 33, Mordant Violet 6, Phenylene blue, Disperse Orange 11, Natural Orange 6, Natural Brown 7, and Natural Yellow 12.

As will be readily appreciated by one skilled in the art, the above process for chemically bonding basic dyestuffs to polymeric substrates not normally receptive to such dyes, can be adapted to a variety of dyeing and/or printing techniques. For example, the printing of advertising and like matter on polymer films can be accomplished readily on a continuous basis by passing a continuous sheet of said film successively through zones in which the film is coated with a radiation-sensitive polymer of the invention, the coated film is exposed imagewise to activating radiation from an appropriate source, the unexposed coating is removed using any of the procedures described above, and finally, the film with image bonded in place is contacted with basic dye.

The following examples describe the manner and process of making and using the invention and set forth the best mode contemplated by the inventors of carrying out the invention but are not to be construed as limiting.

EXAMPLE 1

4-chlorosulfonylphthalic anhydride

To a suspension of 229.35 g. (1.1 mole) of phosphorus pentachloride in 1000 ml. of acetonitrile, there was added slowly a total of 228 g. (1 mole) of 4-sulfophthalic anhydride. The reaction mixture was stirred and heated under reflux for a total of 150 minutes. At the end of this time the solvent was removed by distillation and the residue was dissolved in 1000 ml. of methylene chloride. The solution was washed with 300 ml. of water and then dried over anhydrous magnesium sulfate. The dried solution was filtered and the filtrate was evaporated to dryness. The residue was distilled in vacuo to obtain 163.2 g. (66.2 percent theoretical yield) of 4-chlorosulfonylphthalic anhydride having a boiling point of 170° C. at 0.5 mm. of mercury. The product solidified on standing to a crystalline solid having a melting point of 91 to 92° C. The infrared spectrum of this compound (chloroform solution) exhibited maxima at 1869 and 1786 $cm.^{-1}$.

*Analysis.*—Calc. for $C_8H_3ClO_5S$ (percent): C, 38.95; H, 1.22; Cl, 14.37. Found (percent): C, 38.80; H, 1.53; Cl, 14.16.

EXAMPLE 2

4-azidosulfonylphthalic anhydride

To a solution of 12.3 g. (0.05 mole) of 4-chlorosulfonylphthalic anhydride in 125 ml. of acetonitrile, was added slowly with stirring, 3.25 g. (0.05 mole) of sodium azide. After the addition was complete the mixture was stirred at circa 25° C. for four hours. At the end of this time the sodium chloride which had separated was removed by filtration and the filtrate was evaporated to dryness. The residue was triturated with ether and then filtered and dried in vacuo. There was thus obtained 8.8 g. (69.5 percent theoretical yield) of 4-azidosulfonylphthalic anhydride in the form of a crystalline solid having a melting point of 93 to 94° C. The infrared spectrum of the compound (chloroform solution) exhibited maxima at 1869 and 1786 $cm.^{-1}$.

*Analysis.*—Calc. for $C_8H_3N_3O_5S$ (percent): C, 37.94; H, 1.18; N, 16.60. Found (percent): C, 38.27; H, 1.09; N, 16.23.
We claim:
1. A compound having the formula:
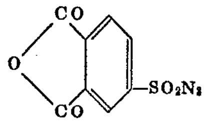
References Cited
Marburg et al., Chem. Abstracts (1966), vol. 64, 15575d.
NICHOLAS S. RIZZO, Primary Examiner
B. DENTZ, Assistant Examiner
U.S. Cl. X.R.
260—75